United States Patent [19]
Pollitt

[11] Patent Number: 5,198,991
[45] Date of Patent: Mar. 30, 1993

[54] PERSONAL COMPUTER WITH DISSOCIATED KEYBOARD

[75] Inventor: Richard F. Pollitt, Highland Beach, Fla.

[73] Assignee: International Business Machines Corp., Armonk, N.Y.

[21] Appl. No.: 621,668

[22] Filed: Nov. 30, 1990

[51] Int. Cl.$^5$ .............................................. G06F 1/00
[52] U.S. Cl. ................................................... 364/708
[58] Field of Search ........................ 364/708; 341/22; 400/472, 479, 482, 488, 489

[56] References Cited

U.S. PATENT DOCUMENTS

| | | |
|---|---|---|
| 3,940,758 | 2/1976 | Margolin . |
| 4,497,036 | 1/1985 | Dunn .................................. 364/708 |
| 4,509,873 | 4/1985 | Ryan ............................. 400/472 X |
| 4,517,660 | 5/1985 | Fushimoto et al. . |
| 4,597,681 | 7/1986 | Hodges . |
| 4,661,005 | 4/1987 | Lahr . |
| 4,769,764 | 9/1988 | Levanon ............................ 364/708 |
| 5,067,834 | 11/1991 | Szmanda et al. ............. 400/472 X |
| 5,119,078 | 6/1992 | Grant ................................. 340/711 |

FOREIGN PATENT DOCUMENTS

| | | | |
|---|---|---|---|
| 57-10830 | 1/1982 | Japan ..................................... 341/22 |
| 2154948 | 9/1985 | United Kingdom ................ 400/479 |

OTHER PUBLICATIONS

Pechanek et al., "Briefcase-Portable Textwriter with 100-Key Full-Size Keyboard", IBM, *Tech. Disclosure Bull.*, vol. 27, NO. 4A, Sep. 1984, pp. 2002-2004.

*Primary Examiner*—Tan V. Mai
*Attorney, Agent, or Firm*—Daniel E. McConnell

[57] ABSTRACT

This invention relates to a personal computer with a folding keyboard and, more particularly, to a personal computer contained within a compact enclosure when stored in a non-use position. The personal computer has a clamshell enclosure having first and second housings joined for pivotal movement one relative to the other about an elongate housing axis and between a folded position and a use position. Computer operating components are mounted in the enclosure. A keyboard assembly is operatively associated with the enclosure and the computer operating components and has first and second keyboard portions each bearing manually engageable elements for entering characters and commands. The portions are coupled together for pivotal movement one relative to the other about a keyboard axis perpendicular to the housing axis and coupled with the enclosure for sliding movement relative between a folded, stored position interposed between the housings and an opened, use position partially displaced from and overlying a side edge of the enclosure. The keyboard assembly has, when folded about the keyboard axis, dimensions received wholly within the outline configuration of the enclosure.

10 Claims, 5 Drawing Sheets

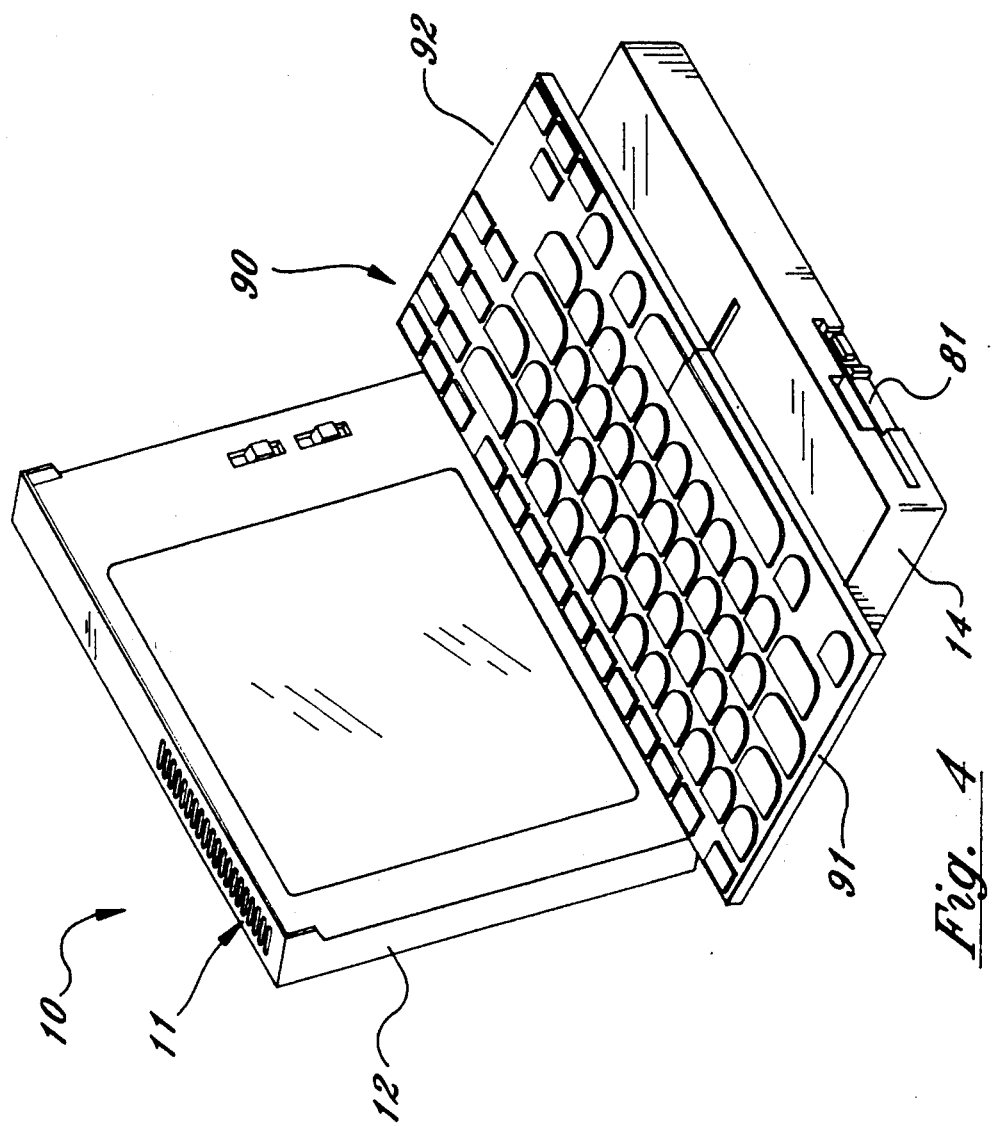

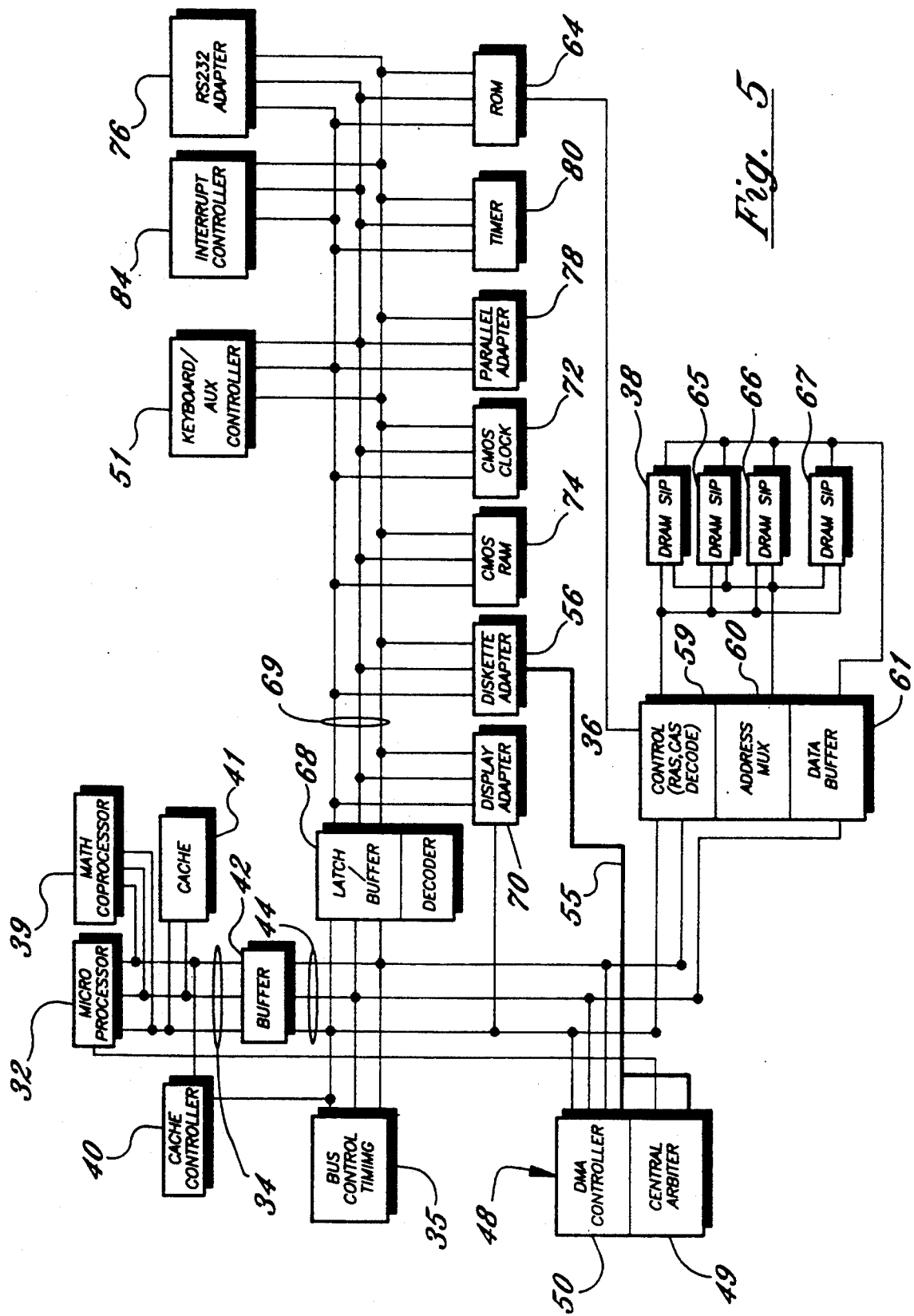

PERSONAL COMPUTER WITH DISSOCIATED KEYBOARD

TECHNICAL FIELD

This invention relates to a personal computer with a dissociatable keyboard and, more particularly, to a personal computer contained within a compact enclosure when stored in a non-use position.

BACKGROUND TO THE INVENTION

Personal computer systems have attained widespread use for providing computer power to many segments of today's modern society. Personal computer systems have heretofore been defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT; compatible computers offered by competitors of IBM; and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80 and other MICRO CHANNEL machines. The Family I models typically have used the popular INTEL 8088, 8086, or 80286 microprocessor as the system processor. The 8088 and 8076 processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Portable personal computers have recently advanced through developments which have been characterized as "luggable", to "laptop", and to "notebook". A "luggable" personal computer is one which is particularly configured to be fairly readily moved from one place to another, and which has a bulk and weight nearly the same as a more conventional desktop machine. A "laptop" personal computer is one which, while weighing about one half as much as and occupying less cubic volume than a luggable, is about the size and weight of a conventional business briefcase loaded with papers. A "notebook" personal computer typically is about the size of a conventional loose leaf binder holding letter size paper, and typically weighs about half as much as a laptop computer. As development of portable personal computers has advanced, substantially the full function of a more conventional desktop machine has been retained, with the exception that portable machines typically include a visual display integrated with the machine and users typically provide a separate printer which will be connected only as required.

A limitation on the reduction in the size of personal computers has been the desire of users for a keyboard at least approximating those known and used with desktop and floor standing machines. Such conventional keyboards typically have an elongated rectangular form with alphanumeric keys arrayed in rows and staggered columns and with special function keys appropriate to the personal computer arrayed around the alphanumeric keys in a standard array. Such keyboards may have varying numbers and arrangements of keys, and several such arrangements have become more or less conventional and known by the number of keys provided. As efforts have been expended toward reducing the physical size of portable personal computers, some designers have chosen to reduce the size of the keys and thus the keyboards, while others have chosen to eliminate or combine certain functions provided in more conventional keyboards. Such efforts have succeeded to the point that notebook portable personal computers have had some success in the marketplace, however users of such computers often have complaints about key size and keyboard arrangement as compared with more conventional keyboards used with desktop machines. Restraints on key size and arrangement have effectively imposed, prior to the present invention, a lower size limitation on keyboard length and width of about the size of a sheet of correspondence stationery.

DISCLOSURE OF THE INVENTION

With the foregoing in mind, it is an object of this invention to provide a portable personal computer in which a keyboard approximating conventional size and placement of keys is incorporated in a computer which has, when in a non-use configuration, length and width dimensions significantly less than those of a conventional keyboard. In realizing this object of the present invention, the personal computer of this invention has a keyboard assembly which may be moved between a disassociated, stored position occupying lesser length and width dimensions and associated, use positions having key sizes and arrays approximating conventional keyboards.

Yet a further object of this invention is to reduce the space requirements for a portable personal computer by removing the limitations previously imposed by keyboard size restraints. In realizing this object of the present invention, the keyboard assembly associated with one housing forming a portion of a clamshell enclosure is pivotable about a joint which permits translation of the keyboard relative to the housing. Such translation enables storage of a substantially full size keyboard within a portable personal computer having length and width dimensions approximately one half of those of prior portable personal computers.

BRIEF DESCRIPTION OF THE DRAWINGS

Some of the objects of the invention having been stated, other objects will appear as the description proceeds, when taken in connection with the accompanying drawings, in which:

FIG. 4 is a view similar to FIG. 3 showing the personal computer of this invention opened into an alternate use position; and FIG. 5 is a schematic representation of the computer operating components of the portable personal computer of this invention.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 3:
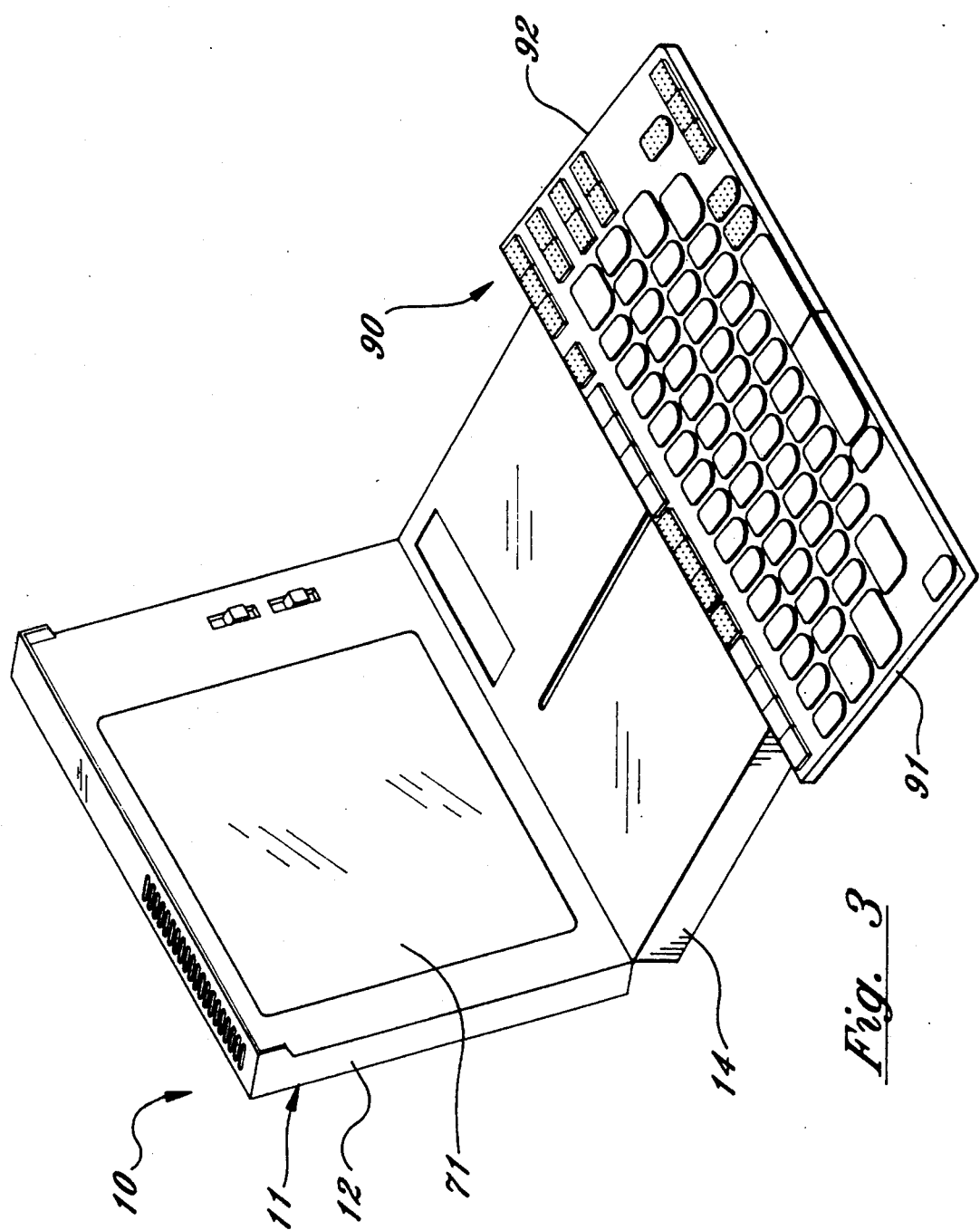
FIG. 3 is a perspective view showing the personal computer of FIG. 1 and 2 opened into a first use position.

Referring now more particularly to the accompanying drawings, the portable personal computer of this invention is there generally identified at 10, and has a clamshell enclosure 11 having first and second housings 12, 14 joined for pivotal movement thereof one relative to the other about an elongate housing axis and between a folded position (FIG. 1) and a use position (FIG. 3 and 4). The enclosure 11 has a predetermined outline configuration, with each of the housings 12, 14 preferably having a generally rectangular parallelepiped configuration with predetermined length, width and depth dimensions. As herein used, "length" refers to the greater side edge dimension of the parallelogram defined by the exposed surface of one of the housings 12, 14, while "width" refers to the lesser side edge dimension of that surface and "depth" refers to the side edge dimension of the parallelepiped which is perpendicular to the surface side edges. In the form shown, the housings 12, 14 are joined for pivotal movement thereof one relative to the other about a housing axis parallel to the lengthwise dimensions thereof and defined by a hinge. The hinge structure may be any suitable hinge appropriate to the usage expected of the computer 10, such as a piano hinge, a "living" hinge molded of synthetic materials, or other hinges known to persons skilled in the applicable arts of mechanical and aesthetic design.

Figure 1:
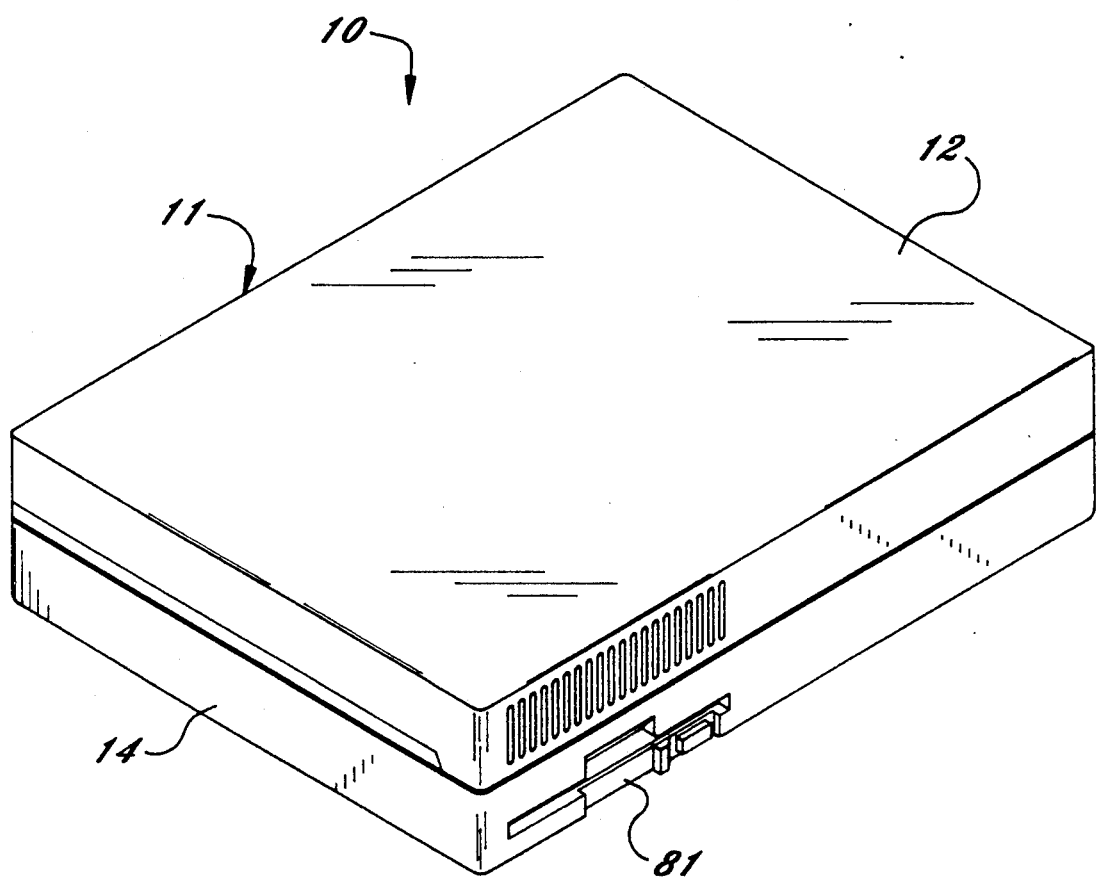
FIG. 1 is a perspective view of the portable personal computer of this invention in a non-use, stored or folded position.

For compactness, it is preferred that the housings 12, 14 have length dimensions which are equal and width dimensions which are less than the length dimension. The width dimensions of the housings preferably are equal, as are the depth dimensions. Thus the portable personal computer may have somewhat the appearance of a book when in the non-use, folded or stored position (FIG. 1).

Computer operating components for supplying the desired computer functions are mounted in the housings 12, 14. At least certain of these components are mounted on a multilayer planar or motherboard (not visible in the drawings) which is mounted in the housings and provides a means for electrically interconnecting components of the computer 10. FIG. 5 shows a block diagram of a personal computer system and illustrates the various components of the computer 10, including components mounted on the planar 20 and other hardware of the personal computer system.

Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80286 which is sold by INTEL.

While the present invention is described hereinafter with particular reference to the system block diagram of FIG. 5, it is to be understood at the outset of the description which follows that it is contemplated that the apparatus in accordance with the present invention may be used with other hardware configurations of the planar board. For example, the system processor could be an Intel 80386 or 80486 microprocessor.

Returning now to FIG. 5, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50.

An arbitration control bus 55 couples the DMA controller 50 and central arbitration unit 49 to a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 5 by the optional memory modules 65 through 67. For purposes of illustration only, the present invention is described with reference to the basic one megabyte memory module 38. A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive a display 71 described more fully hereinafter), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, a keyboard/auxiliary device controller 51, and read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

The computer 10 is provided with a fixed or hard disk drive, also known as a hardfile (not visible in the illustrations) and with a floppy disk drive 81. The floppy disk drive 81 is mounted in one housing 14, in particular relationship to certain other computer operating components as described hereinafter (notably the display 71).

In order to realize the objects of this invention by providing a keyboard of substantially conventional key size and arrangement, the computer 10 in accordance with this invention has a keyboard assembly 90 operatively associated with the enclosure 11 and the computer operating components described immediately hereinabove. The assembly is formed from first and second keyboard portions 91, 92 each of which bears keys or other manually engageable elements for entering characters and commands. The keyboard assembly portions 91, 92 are operatively coupled together for pivotal movement one relative to the other about a keyboard axis which is perpendicular to the housing axis defined by the hinge mentioned above. The keyboard assembly portions 91, 92 are also operatively coupled with the enclosure 10 for sliding movement relative thereto between a folded, stored position interposed between the housings and an opened, use position partially displaced from and overlying a side edge of the enclosure 11, with the keyboard assembly 90 being pivotable about the keyboard axis and having, when folded, dimensions such that it is received wholly within the outline configuration of the enclosure 11 (FIG. 1).

Preferably, the keyboard assembly 90 is coupled (as described more fully hereinafter) to one of the clamshell enclosure housings (the housing 14 in the illustrations) which is herein identified as the "coupled" housing.

Each of the keyboard assembly portions 91, 92 preferably has a generally rectangular parallelepiped configuration with predetermined length, width and depth dimensions. The meanings of "length", "width", and "depth" as used with reference to the keyboard assembly portions are generally the same as stated above with reference to the clamshell enclosure housings 12, 14, although care must be used due to the varying orientation of the portions 91, 92 during movement between stored and use positions as will be brought out hereinafter. "Lengthwise" is the greatest dimension of the keyboard assembly when oriented for use. The keyboard axis mentioned above extends parallel to the depthwise dimensions of the portions 91, 92 and generally perpendicular to the housing axis defined by the hinge mentioned hereinabove. The dimensions of the keyboard portions 91, 92 bear particular relationships to the dimensions of the clamshell enclosure housings 12, 14, in that the length dimensions of the portions are approximately equal to the widthwise dimension of the coupled housing 14 and the widthwise dimensions of the portions are approximately equal to one half of the lengthwise dimension of the coupled housing 14.

Figure 2:
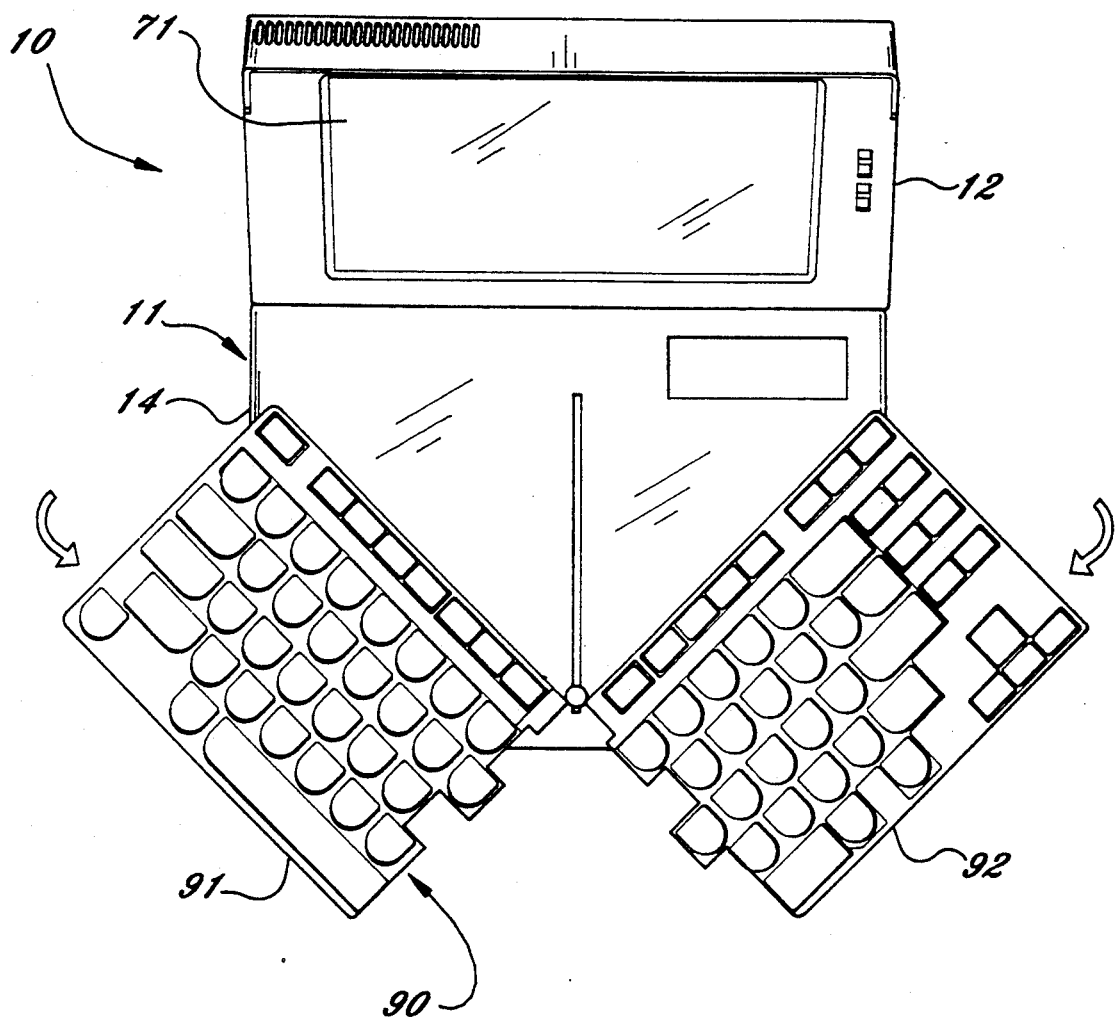
FIG. 2 is a plan view from above showing the personal computer of FIG. 1 in the process of being opened into a use position.

In accordance with important distinguishing characteristics of this invention, the keyboard portions 91, 92 are movable between a folded position in which lengthwise side edges of the first and second portions adjoin (FIG. 1) and an opened use position in which widthwise side edges of the first and second portions adjoin (FIGS. 3 and 4). This movement occurs about a joint which operatively couples the keyboard portions one to the other for pivotal movement one relative to the other about the keyboard axis mentioned above and operatively couples the portions with one of the housings 12, 14 (the coupled housing 14 in the illustrations) for sliding movement relative thereto between a position superperposed on the coupled housing (FIG. 4) and a position partially displaced from the coupled housing and partially overlying a lengthwise side edge thereof (FIG. 3). The joint is preferable provided by a pin defining the keyboard axis. The pin functions as a sliding connector coupling the keyboard assembly 90 and the coupled housing 14 and accommodating linear movement of the keyboard axis between locations adjacent the two lengthwise side edges of the coupled housing. The pin also functions to capture the keyboard assembly against ready separation from the coupled housing. One manner of achieving this result is to provide a slot in the coupled housing (FIGS. 2, 3) with the pin having a headed end within the coupled housing 14.

It will be noted that the keys provided on the keyboard portions 91, 92 are arrayed in the normal arrangement of lengthwise rows and angled widthwise columns, with function or command keys placed about the alphanumeric keys. Due the to presence of angled columns and the desire for generally parallelepiped configurations for the portions 91, 92, the division along the widthwise side edges which are brought into adjoining relation for use of the keyboard is not along a straight line. Instead, the division results in an interdigitated joining together of castellated, stairstepped or interrupted side edges.

The keys provided on the keyboard portions may use presently known keyboard technologies to achieve the necessary function. Preferably, the keyboard uses membranes bearing conductive strips and a "rubber dome" key activation system to enable establishing contacts representative of manual activation of selected keys. However, the keyboard may use buckling spring or leaf spring technology, with the spring elements being either plastic materials for weight reduction or metal materials.

Signals indicative of key depression are delivered to the computer operating components described above through a pair of keyboard scanning devices, one mounted in each of said keyboard portions for scanning those manually engageable elements mounted in the corresponding portion. The scanning devices forward to the keyboard/auxiliary controller 51 (and thence to the central processor unit 32) signals indicative of the characters and commands keyed by a user. Signals forwarded by the scanning devices preferably pass through signal communicating conductors extending through the pin which joins together the keyboard portions 91, 92 and the coupled housing 14.

In use, when the portable personal computer 10 of this invention is stored or not in use, the keyboard portions 91, 92 are disassociated, pivoted or folded with lengthwise side edges adjoining. In such a position, and with the clamshell enclosure 11 folded closed about the housing axis defined by the hinge joining them, the exterior appearance of the computer 10 resembles a book. The housings 12, 14 are movable between the folded position just described, in which the first and second housings are superposed and externally facing planar parallelogram surfaces thereof are parallel, and a opened use position (FIGS. 2, 3 and 4) in which the first and second housings are angularly disposed and the externally facing parallelogram surfaces thereof define therebetween an obtuse angle. As so opened, a user will be able to view a display screen 71 mounted in one of the housings. Preferably, and as illustrated, the display screen 71 is mounted in the one of the housings (housing 12) other than the coupled housing 14. The display may be any suitable display, with a preference at the time of disclosure of this invention for the type known as an LCD (for Liquid Crystal Display) screen. As known to persons of skill in the appropriate arts, such a display screen is capable of presenting to a user a visual display of information processed by the personal computer 10.

As the computer 10 is opened into use position, the keyboard assembly becomes exposed and the keyboard portions may be pivoted downwardly (FIG. 2) into a position in which the widthwise side edges interdigitate and adjoin and the keys come into the alignment and array known for conventional keyboards. As so positioned, use of the computer in known ways may begin. It will be noted that the keyboard may be positioned in at least two particular ways. First, should a user desire to use the portable computer at a conventional desk or the like, the keyboard assembly 90 may be moved to a position partially displaced from the coupled housing 14 and partially overlying a lengthwise side edge thereof. Preferably, when so positioned, the keyboard assumes an acute included angle to the horizontal of about twelve degrees, the same as the angle of a conventional desktop keyboard. Alternatively, should the user be required to use the computer in more restricted space (such as on the tray table of an airliner), the keyboard assembly 90 may be moved to a position superposed on the coupled housing 14 (FIG. 4) while retaining the advantages of a substantially full sized keyboard. It is the joint connection described hereinabove which makes such usage possible.

The knowledgeable reader will understand that the keyboard assembly of this invention, while disclosed with particular reference to a portable personal computer, will have utility apart from the specific embodiment illustrated and described in detail. More particularly, the keyboard apart from the portable computer may be used with more conventional desktop or upright personal computers, and may be housed only within a decorative housing, or simply unhoused. As will be understood, in the latter instances, the other elements described as being present in the preferred embodiment may be missing in such adapted embodiments.

In the drawings and specifications there has been set forth a preferred embodiment of the invention and, although specific terms are used, the description thus given uses terminology in a generic and descriptive sense only and not for purposes of limitation.

What is claimed is:

1. A personal computer comprising:
    first and second housings each having a generally rectangular parallelepiped configuration with predetermined length, width and depth dimensions, said housings being joined for pivotal movement thereof one relative to the other about a housing axis parallel to the lengthwise dimensions thereof;
    a display mounted in one of said housings for presenting to a user a visual display of information processed by the personal computer;
    a central processor unit mounted in one of said housings for manipulating information and operatively connected with said display;
    random access memory mounted in one of said housings for exchanging with said central processor unit information manipulated by said central processor unit and for storing information exchanged;
    a direct memory access controller mounted in one of said housings and operatively associated with said central processor unit and said random access memory for controlling access to said random access memory;
    a direct access storage device mounted in one of said housings for exchanging information with said central processor unit and said random access memory and operatively associated with said direct memory access controller;
    a power supply mounted in one of said housings for supplying energy for the operation of said display, said central processing unit, said random access memory, said direct memory access controller, and said direct access storage device; and
    a keyboard assembly operatively associated with said housings and said central processing unit and comprising first and second keyboard portions each bearing manually engageable elements for entering characters and commands, said portions being operatively coupled together for pivotal movement one relative to the other about a keyboard axis and operatively coupled with one of said housings for sliding movement relative thereto between a position superposed on said coupled housing and a position partially displaced from said coupled housing and partially overlying a lengthwise side edge thereof.

2. A personal computer according to claim 1 wherein said direct access storage device is mounted in one of said housings and said display is mounted in the other of said housings.

3. A personal computer according to claim 2 wherein said direct access storage device is mounted said coupled housing.

4. A personal computer comprising:
    first and second housings each have a generally rectangular parallelepiped configuration with predetermined length, width and depth dimensions;
    a hinge joining said first and second housings for pivotal movement of said housings one relative to the other about a housing axis parallel to lengthwise dimensions thereof;

a display mounted in one of said housings for presenting to a user a visual display of information processed by the personal computer;

a central processor unit mounted in one of said housings for manipulating information and operatively connected with said display;

random access memory mounted in one of said housings for exchanging with said central processor unit information manipulated by said central processor unit and for storing information exchanged;

a direct memory access controller mounted in one of said housings and operatively associated with said central processor unit and said random access memory for controlling access to said random access memory;

a direct access storage device mounted in one of said housings for exchanging information with said central processor unit and said random access memory and operatively associated with said direct memory access controller;

a power supply for supplying energy for the operation of said computer operating components; and a keyboard assembly operatively associated with said housings and said central processing unit and comprising:

first and second keyboard portions each bearing manually engageable elements for entering characters and commands; and a joint operatively coupling said keyboard portions one to the other for pivotal movement one relative to the other about a keyboard axis and operatively coupling said keyboard portions with one of said housings for sliding movement relative thereto between a position superposed on said coupled housing and a position partially displaced from said coupled housing and partially overlying a lengthwise side edge thereof;

said keyboard assembly being pivotable about said keyboard axis to length and width dimensions no greater than those of said housings.

5. A personal computer according to claim 4 wherein said direct access storage device is mounted in one of said housings and said display is mounted in the other of said housings.

6. A personal computer according to claim 5 wherein said direct access storage device is mounted said coupled housing.

7. A personal computer comprising:

a first housing having a generally rectangular parallelepiped configuration with predetermined length, width and depth dimensions;

a second housing having a generally rectangular parallelepiped configuration with predetermined length, width and depth dimensions;

a hinge joining said first and second housings for pivotal movement of said housings one relative to the other about an axis parallel to lengthwise dimensions thereof;

a display housed within one of said first and second housings;

a central processor unit mounted in said housings for manipulating information and operatively connected with said display;

random access memory mounted in said housings for exchanging with said central processor unit information manipulated by said central processor unit and for storing information exchanged;

a direct memory access controller mounted in said housings and operatively associated with said central processor unit and said random access memory for controlling access to said random access memory;

a direct access storage device mounted in said housings for exchanging information with said central processor unit and said random access memory and operatively associated with said direct memory access controller;

a power supply mounted in said housings for supplying energy for the operation of said central processor unit, said random access memory, said direct memory access controller, and said direct access storage device; and a keyboard assembly operatively associated with the other of said first and second housings, said keyboard assembly comprising:

a first keyboard portion bearing manually engageable elements for entering characters and commands;

a second keyboard portion bearing manually engageable elements for entering characters and commands;

a pin operatively coupling said keyboard portions one to the other for pivotal movement one relative to the other about a predetermined axis and operatively coupling said keyboard portions with said other housing for sliding movement relative thereto between a position superposed on said coupled housing and a position displaced from said coupled housing and partially overlying a lengthwise side edge thereof;

said keyboard assembly being pivotable to length and width dimensions no greater than those of said housings.

8. A personal computer according to claim 7 wherein said direct access storage device is mounted in said coupled housing.

9. A personal computer according to claim 7 further comprising a pair of keyboard scanning devices, one mounted in each of said keyboard portions for scanning those manually engageable elements mounted in the corresponding portion, said scanning devices forwarding to said central processor unit signals indicative of the characters and commands keyed by a user.

10. A personal computer comprising:

a first housing having a generally rectangular parallelepiped configuration with predetermined length, width and depth dimensions;

a second housing having a generally rectangular parallelepiped configuration with predetermined length, width and depth dimensions;

said length dimensions of said housings being equal and said width dimensions of said housings being less than said length dimension;

said width dimensions of said housings being equal;

a hinge joining said first and second housings for pivotal movement of said housings one relative to the other about a housing axis parallel to lengthwise dimensions thereof;

said housings being movable between a folded position in which said first and second housings are superposed and externally facing planar parallelogram surfaces thereof are parallel and a opened use position in which said first and second housings are angularly disposed and the externally facing parallelogram surfaces thereof define therebetween an obtuse angle;

a display mounted in one of said first and second housings;

a central processor unit mounted in one of said first and second housings for manipulating information and operatively connected with said display;

random access memory mounted in one of said first and second housings for exchanging with said processor unit information manipulated by said processor unit and for storing information exchanged;

a direct memory access controller mounted in one of said first and second housings and operatively associated with said central processor unit and said random access memory for controlling access to said random access memory;

a direct access storage device mounted in the other housing from said display for exchanging information with said processor unit and said random access memory and operatively associated with said direct memory access controller;

a power supply mounted in one of said first and second housings for supplying energy for the operation of said display, said central processor unit, said random access memory, said direct memory access controller, and said direct access storage device;

a keyboard assembly operatively associated with said other housing, said keyboard assembly comprising:

a first keyboard portion bearing manually engageable elements for entering characters and commands;

a second keyboard portion bearing manually engageable elements for entering characters and commands;

said keyboard portions each having a generally rectangular parallelepiped configuration with predetermined length, width and depth dimensions;

said length dimensions of said portions being approximately equal to said widthwise dimension of said other housing and said widthwise dimensions of said portions being approximately equal to one half of said lengthwise dimension of said other housing;

a pin operatively coupling said keyboard portions one to the other for pivotal movement one relative to the other about a keyboard axis extending parallel to the depthwise dimensions of said portions, said pin operatively coupling said keyboard portions with said other housing for sliding movement relative thereto between a position superposed on said coupled housing and a position displaced from said coupled housing and partially overlying a lengthwise side edge thereof;

said pin functioning as a sliding connector coupling said keyboard assembly and said coupled housing and accommodating linear movement of said keyboard axis between locations adjacent each of the two lengthwise edges of said coupled housing and capturing said keyboard assembly against ready separation from said other housing;

said keyboard portions being movable between a folded position in which lengthwise side edges of said first and second portions adjoin and an opened use position in which widthwise side edges of said first and second portions adjoin;

a pair of keyboard scanning devices, one mounted in each of said keyboard portions for scanning those manually engageable elements mounted in the corresponding portion, said scanning devices forwarding to said central processor unit signals indicative of the characters and commands keyed by a user; and signal communicating conductors extending through said pin for operatively connecting said scanning devices and said central processor unit.

* * * * *